United States Patent
Jouan et al.

(10) Patent No.: US 12,385,438 B2
(45) Date of Patent: Aug. 12, 2025

(54) INSTALLATION FOR HEATING A CRYOGENIC FUEL

(71) Applicant: SAFRAN, Paris (FR)

(72) Inventors: Hugo Pierre Mohamed Jouan, Moissy-Cramayel (FR); Samer Maalouf, Moissy-Cramayel (FR)

(73) Assignee: SAFRAN, Paris (FR)

(*) Notice: Subject to any disclaimer, the term of this patent is extended or adjusted under 35 U.S.C. 154(b) by 0 days.

(21) Appl. No.: 17/927,556

(22) PCT Filed: May 26, 2021

(86) PCT No.: PCT/FR2021/050954
§ 371 (c)(1),
(2) Date: Nov. 23, 2022

(87) PCT Pub. No.: WO2021/240111
PCT Pub. Date: Dec. 2, 2021

(65) Prior Publication Data
US 2023/0243308 A1  Aug. 3, 2023

(30) Foreign Application Priority Data
May 28, 2020 (FR) .................................... 2005628

(51) Int. Cl.
*F02C 7/224* (2006.01)
*F02C 3/22* (2006.01)
*F02C 7/141* (2006.01)

(52) U.S. Cl.
CPC ............... *F02C 7/224* (2013.01); *F02C 3/22* (2013.01); *F02C 7/141* (2013.01); *F05D 2260/213* (2013.01); *F05D 2260/606* (2013.01)

(58) Field of Classification Search
CPC .... F02C 7/224; F02C 7/141; F05D 2260/213; F05D 2260/606
See application file for complete search history.

(56) References Cited

U.S. PATENT DOCUMENTS

| | | | |
|---|---|---|---|
| 2013/0327052 A1* | 12/2013 | O'Neill | F02C 6/18 60/697 |
| 2015/0033761 A1* | 2/2015 | Bourassa | F02C 7/12 29/428 |

(Continued)

FOREIGN PATENT DOCUMENTS

| | | |
|---|---|---|
| EP | 3623602 A1 | 3/2020 |
| EP | 3623604 A1 | 3/2020 |

(Continued)

OTHER PUBLICATIONS

French Search Report for 2005628 dated Feb. 8, 2021.
(Continued)

*Primary Examiner* — Devon C Kramer
*Assistant Examiner* — Roberto Toshiharu Igue
(74) *Attorney, Agent, or Firm* — Sughrue Mion, PLLC

(57) ABSTRACT

A system for heating cryogenic fuel includes a storage take, a supply line, a closed circuit, a cryogenic fuel heat exchanger, one or more working fluid heat exchangers, and a controller The storage tank stores the cryogenic fuel in a liquid state. The supply line connects the storage tank to a combustion chamber of an aircraft turbine engine. The closed circuit circulates a heat-transfer fluid. The cryogenic fuel heat exchanger heats the cryogenic fuel by the heat-transfer fluid. The closed circuit includes a pump for circulating the heat-transfer fluid and a closed expansion vessel connected to the closed circuit. The controller controls the pump to ensure a heat-transfer fluid flow rate inside the closed circuit so that the closed expansion vessel keeps the heat-transfer fluid circulating in the closed circuit at a pressure such that the heat-transfer fluid remains in the liquid state and does not change phase.

7 Claims, 6 Drawing Sheets

(56) References Cited

U.S. PATENT DOCUMENTS

| 2016/0195013 A1* | 7/2016 | Epstein | C10L 10/08 |
| | | | 60/39.463 |
| 2017/0030266 A1 | 2/2017 | Cerny et al. | |
| 2020/0088102 A1* | 3/2020 | Roberge | F02C 7/224 |

FOREIGN PATENT DOCUMENTS

| GB | 2131094 A * | 6/1984 | F02C 7/14 |
| WO | WO-0107765 A1 * | 2/2001 | F02C 3/22 |
| WO | 2012/026828 A1 | 3/2012 | |
| WO | 2012/059752 A2 | 5/2012 | |

OTHER PUBLICATIONS

French Written Opinion for 2005628 dated Feb. 8, 2021.
International Search Report for PCT/FR2021/050954 dated Sep. 7, 2021.
Translation of Office Action issued Apr. 9, 2025 in Chinese Patent Application No. 202180044796.9.

* cited by examiner

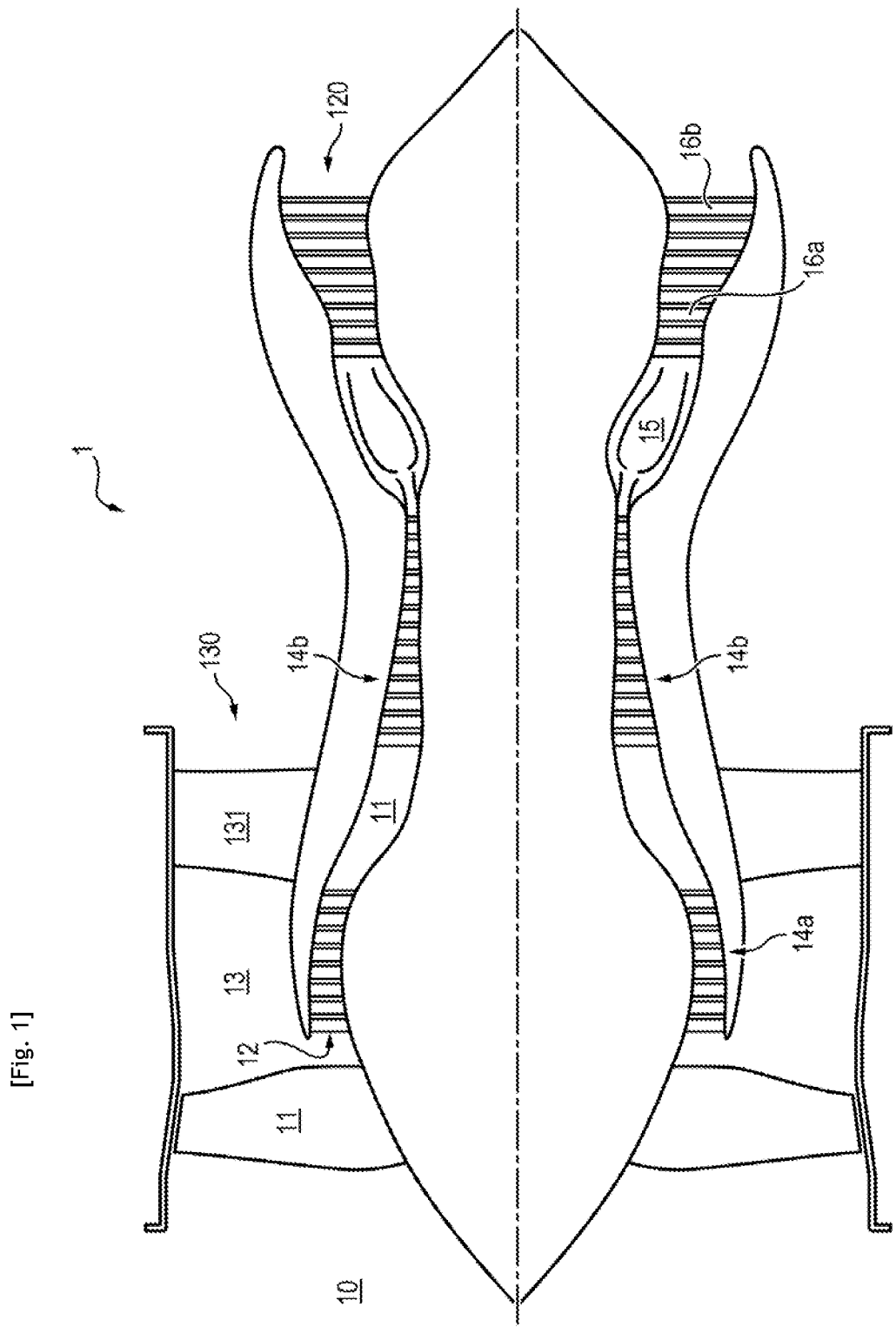
[Fig. 1]

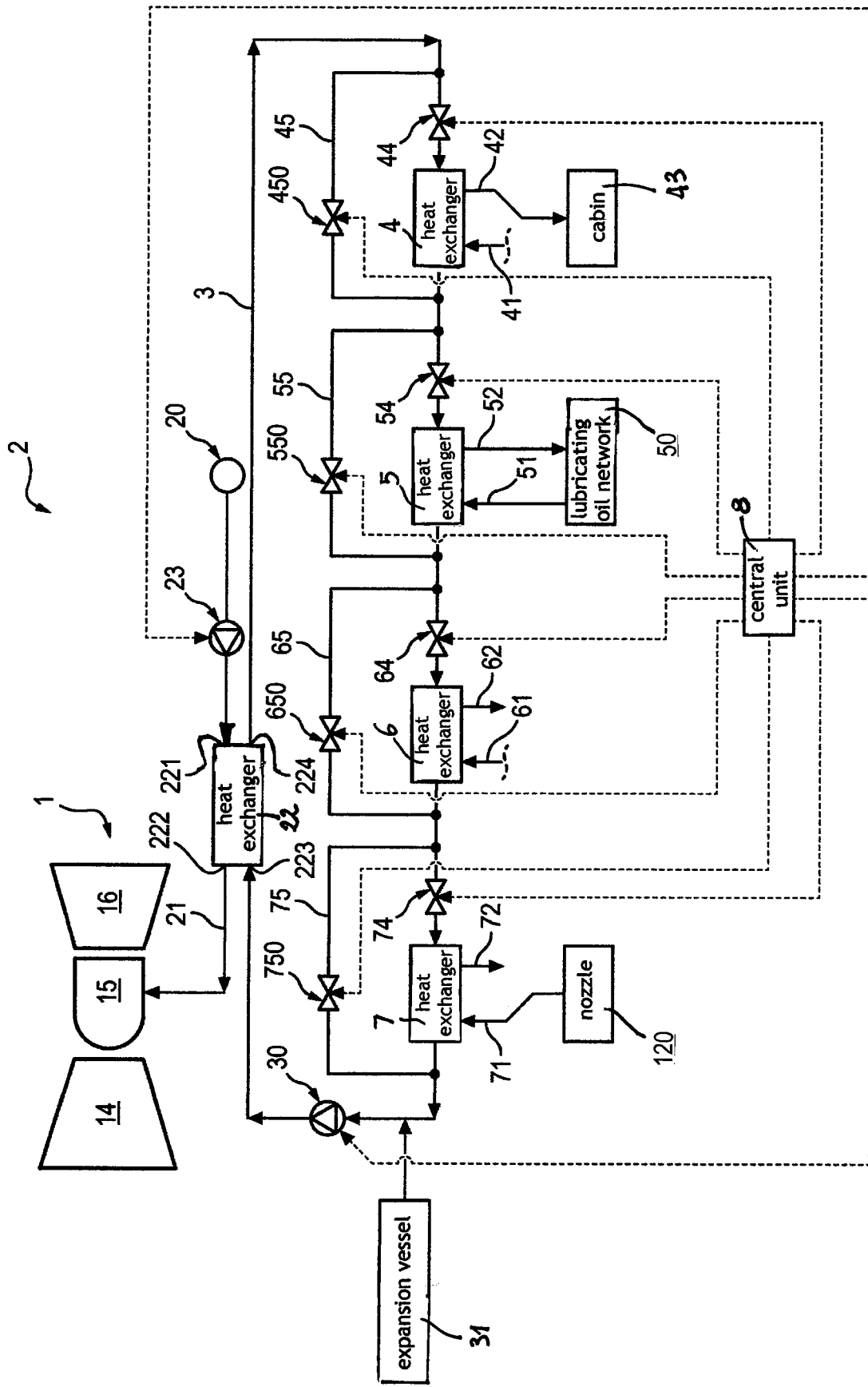
[Fig. 2]

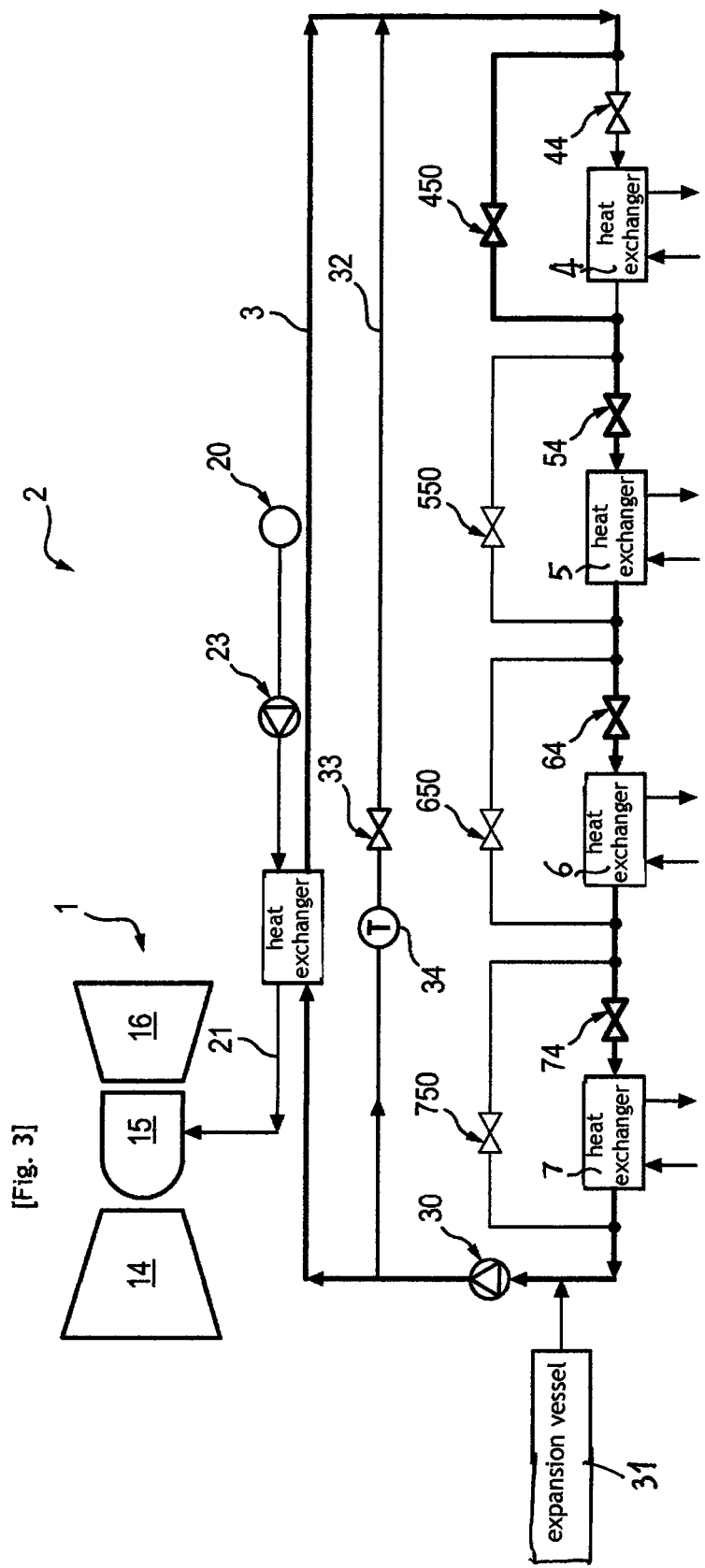
[Fig. 3]

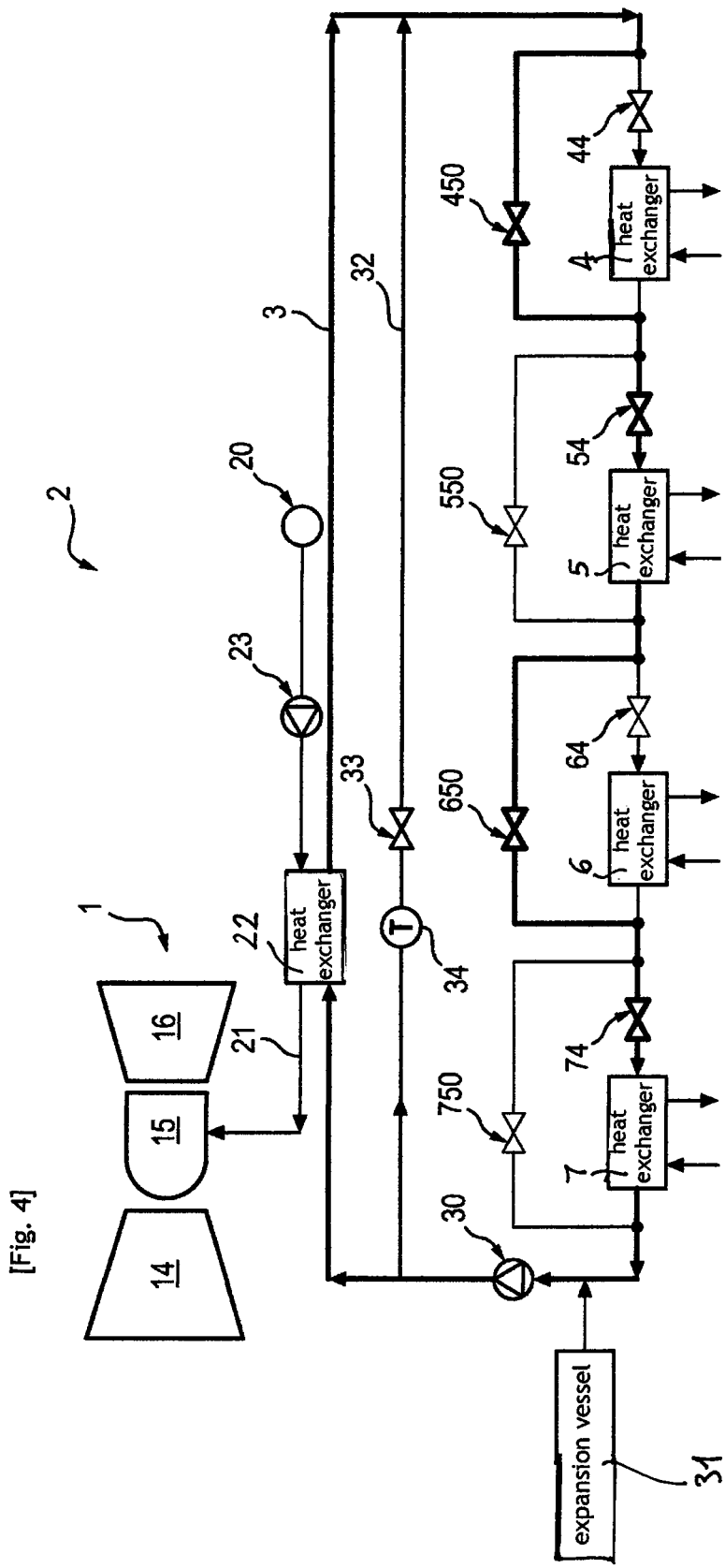
[Fig. 4]

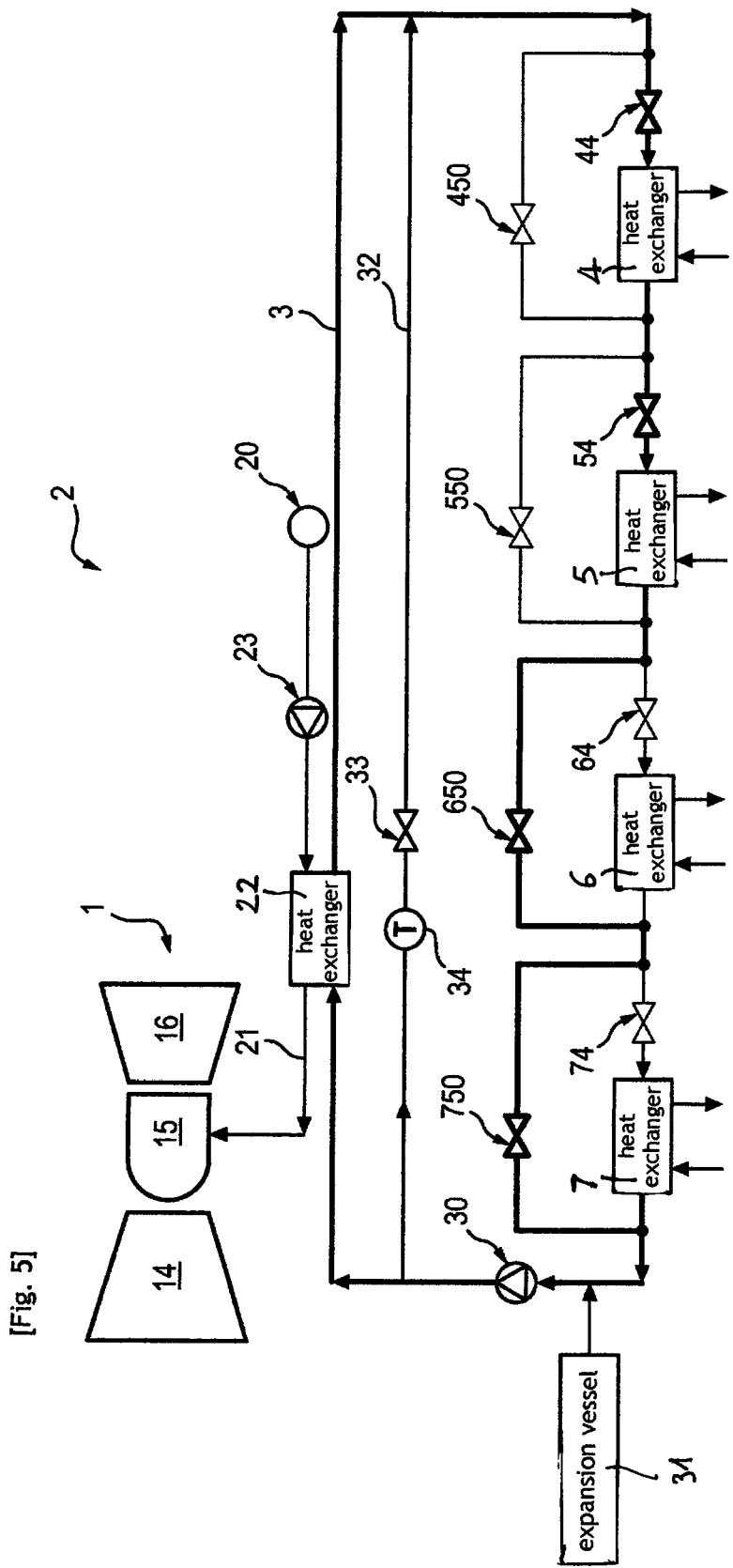

[Fig. 6]
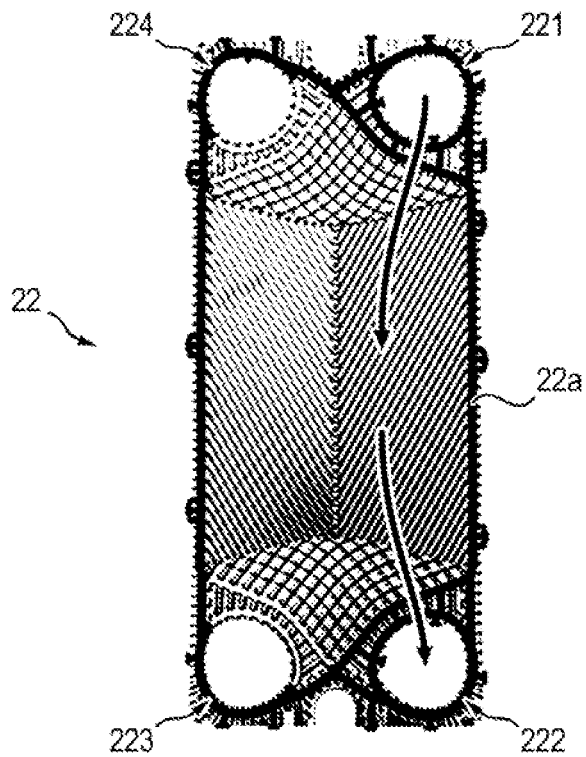
[Fig. 7]
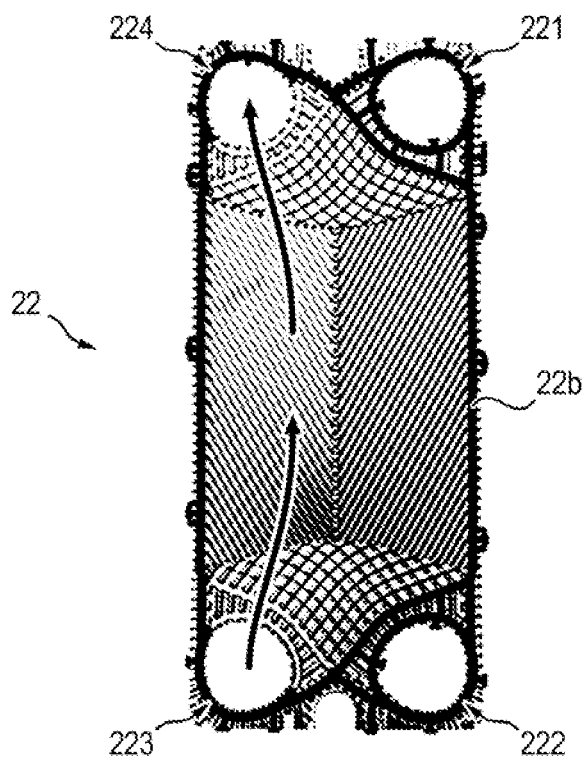

INSTALLATION FOR HEATING A CRYOGENIC FUEL

This application is a National Stage of International Application No. PCT/FR2021/050954 filed May 26, 2021, claiming priority based on French Patent Application No. 2005628 filed May 28, 2020.

FIELD OF THE INVENTION

The invention is in the field of aircraft turbine engines.

The present invention relates, more precisely, to a system for heating a cryogenic fuel supplying the combustion chamber of an aircraft turbine engine, and also relates to an aircraft turbine engine operating with this cryogenic fuel and equipped with such a system.

PRIOR ART

The use of a cryogenic fuel for supplying the combustion chamber of an aircraft turbine engine is known. Such a cryogenic fuel is, for example, liquid natural gas (known by the acronym "LNG"). Such a fuel is less costly than conventional kerosene and further limits $CO_2$ emissions. More specifically, LNG emits 25% less $CO_2$ per unit of energy.

However, LNG must be transported in liquid form in order that the volume to be transported in an aeroplane is acceptable. Its liquefaction temperature at one bar ($10^5$ Pascal) is minus 161° C. However, it is preferable to inject LNG in gaseous form into the combustion chamber, since this has numerous advantages. It is therefore necessary to vaporise it, pressurise it and heat it until it reaches the injection temperature, which is of order 50° C.

In the prior art, it has been suggested to heat the cryogenic fuel by passing it into a heat exchanger, inside which air from the exhaust gas coming from the turbine engine nozzle circulates. However, there is then the risk that the water vapour present in these exhaust gases transforms into ice on the wall of said heat exchanger.

It has also been suggested to heat the cryogenic fuel by allowing it to pass into a heat exchanger, inside which oil circulates, for example lubricating oil of the accessories present in said turbine engine. However, because of the extremely low temperature of cryogenic fuel, there is a risk that the lubricating oil will be cooled too far and become too viscous to be able to be used again for lubricating these accessories.

Moreover, a rapid injection of cryogenic fuel in the liquid state onto the hot walls of the oil/cryogenic fluid exchanger causes part of this liquid to vaporise. The gas formed accumulates in the cryogenic fuel circulation circuit and the pressure inside it increases. This prevents the liquid cryogenic fuel from circulating. It is therefore necessary to start by sending the liquid cryogenic fuel into the oil/cryogenic fluid exchanger at a low flow rate, in order that the gas formed can be evacuated until the wall of said exchanger cools to reach the temperature of the cryogenic fuel. Then, only the two-phase oil/cryogenic fuel exchanger is in operation.

For any liquid, the temperature at which this liquid vaporises, as well as the energy necessary for this vaporisation, depend on its pressure. In the present case, if the cryogenic fuel is only pressurised upstream of the exchanger, in other words while it is still in the liquid phase, to do away with a compressor downstream of the exchanger, then its change of state temperature, as well as the energy required for its change of state, are no longer freely controllable but are imposed by the pressure of the fuel in the liquid state, upstream of the exchanger. The management of the system is complicated, if there are a number of two-phase exchangers present.

Finally, it might be desirable to use the fuel in the combustion chamber, no longer in the gaseous state but in the supercritical fluid state, which is not provided for in the cited prior art. As a reminder, it will be recalled that the fuel achieves the supercritical fluid state when it is brought to a temperature greater than its critical temperature and to a pressure greater than its critical pressure.

DISCLOSURE OF THE INVENTION

A first object of the invention is to develop a system for heating a cryogenic fuel supplying the combustion chamber of an aircraft turbine engine, which does not have the above-mentioned disadvantages.

Another object of the invention is that such a system operates in an ecologically and economically advantageous manner.

To this effect, the invention relates to a system for heating a cryogenic fuel supplying the combustion chamber of an aircraft turbine engine, this system comprising:
- a storage tank for said cryogenic fuel in the liquid state,
- a supply line configured to connect said tank to said combustion chamber of the aircraft turbine engine,
- a closed circuit for circulation of a heat-transfer fluid,
- a cryogenic fuel/heat-transfer fluid heat exchanger and at least one heat-transfer fluid/working fluid heat exchanger, mounted in series in said closed circuit, the cryogenic fuel/heat-transfer fluid heat exchanger enabling heating of the cryogenic fuel by an input of heat delivered by the heat-transfer fluid.

In accordance with the invention, this closed circuit for circulation of the heat-transfer fluid comprises a pump for circulating said heat-transfer fluid and a closed expansion vessel connected to said closed circuit upstream of said pump with respect to the direction of circulation of the heat-transfer fluid in the closed circuit, and said pump is controlled by a central unit so as to ensure a heat-transfer fluid flow rate inside the closed circuit which enables cooling of the working fluid or fluids and heating of the cryogenic fuel according to the operating phases of the aircraft, and so that the closed expansion vessel keeps the heat-transfer fluid circulating in said closed circuit at a pressure such that it remains in the liquid state and does not change phase.

Through these features of the invention, it is possible, on the one hand, to recover the heat originating from various heat sources present in the aircraft and to transfer it to the heat-transfer fluid which circulates in the closed circuit and, on the other hand, to keep this heat-transfer fluid in the single-phase liquid state with only a fluctuation of its temperature and finally to then have only a single heat exchanger with the cryogenic fuel, in which the heating of this fuel takes place.

According to a first alternative embodiment of the invention, the system comprises a pump disposed in the supply line between said tank and the heat exchanger, this pump is a high-pressure pump which can compress the cryogenic fuel in the liquid state in order to bring it to a pressure greater than its critical pressure, and said cryogenic fuel/heat-transfer fluid heat exchanger is a supercritical heat exchanger which can heat the cryogenic fuel to a temperature greater than its critical temperature in order to bring it into the supercritical fluid state before its introduction into the combustion chamber.

According to a second alternative embodiment of the invention, the system comprises a pump disposed in the supply line between said tank and the heat exchanger, this pump is a pump which can compress the cryogenic fuel in the liquid state in order to bring it to a pressure less than its critical pressure and said cryogenic fuel/heat-transfer fluid heat exchanger is a two-phase heat exchanger, which can heat the cryogenic fuel by an input of heat delivered by said heat-transfer fluid, in order to take this cryogenic fuel from the liquid state to the gaseous state, before its introduction into the combustion chamber.

According to other advantageous and non-limiting features of the invention, taken alone or in combination:

the working fluid of the heat-transfer fluid/working fluid heat exchanger is chosen from the bleed air taken at the outlet of the turbine engine compressor, the lubricating oil, the cooling air of the turbine blades of the turbine engine and the exhaust gas at the outlet of the turbine engine nozzle;

the system comprises at least one heat exchanger between the heat-transfer fluid and the bleed air taken at the outlet of the turbine engine compressor;

it comprises at least two heat-transfer fluid/working fluid heat exchangers, including a heat exchanger between the heat-transfer fluid and the bleed air taken at the outlet of the turbine engine compressor, and the heat exchanger between the heat-transfer fluid and the bleed air taken at the outlet of the turbine engine compressor is disposed upstream of the other heat-transfer fluid/working fluid heat exchanger or the other heat-transfer fluid/working fluid heat exchangers, with respect to the direction of circulation of the heat-transfer fluid in the closed circuit;

it comprises a heat exchanger between the heat-transfer fluid and the exhaust gas at the outlet of the turbine engine nozzle and is mounted in series with the heat exchanger between the heat-transfer fluid and the bleed air taken at the outlet of the turbine engine compressor, so as to be located downstream thereof with respect to the direction of circulation of the heat-transfer fluid in the closed circuit;

it comprises at least one heat exchanger between the heat-transfer fluid and the bleed air taken at the outlet of the turbine engine compressor, a heat-transfer fluid/oil heat exchanger, a heat exchanger between the heat-transfer fluid and the air cooling the turbine blades, and a heat exchanger between the heat-transfer fluid and the exhaust gas at the outlet of the turbine engine nozzle, mounted in series in the closed circuit for circulation of the heat-transfer fluid;

it comprises a heat exchanger between the heat-transfer fluid and the bleed air taken at the outlet of the turbine engine compressor, a heat-transfer fluid/oil heat exchanger, a heat exchanger between the heat-transfer fluid and the air cooling the turbine blades and a heat exchanger between the heat-transfer fluid and the exhaust gas at the outlet of the turbine engine nozzle, mounted in series and in this order in the closed circuit for circulation of the heat-transfer fluid;

it comprises at least two heat-transfer fluid/working fluid heat exchangers and, for at least one of these two heat-transfer fluid/working fluid heat exchangers, an on-off valve is mounted in said closed circuit, upstream of said heat heat-transfer fluid/working fluid exchanger, and a bypass circuit connects a point of said closed circuit located upstream of this on-off valve to a point of said closed circuit located downstream of said heat heat-transfer fluid/working fluid exchanger, and this bypass circuit is provided with an on-off valve;

the cryogenic fuel is liquefied natural gas or liquid hydrogen.

said two-phase cryogenic fuel/heat-transfer fluid heat exchanger is a plate exchanger.

The invention also relates to an aircraft turbine engine.

According to the invention, this turbine engine comprises a combustion chamber supplied with cryogenic fuel and a system for heating this cryogenic fuel as described above.

DESCRIPTION OF THE FIGURES

Other features, aims and advantages of the invention will emerge from the following description, which is given purely by way of illustration and not being limiting and which should be read with reference to the attached drawings, in which:

FIG. 1 is a diagram showing an exemplary embodiment of an aircraft turbine engine, here a twin-spool bypass turbine engine.

FIG. 2 is a diagram showing an exemplary embodiment of a system for heating a cryogenic fuel according to the invention, this fuel being intended to supply the combustion chamber of an aircraft turbine engine.

FIG. 3 is a diagram showing the operation of the system of FIG. 2 during take-off of the aircraft.

FIG. 4 is a diagram showing the operation of the system of FIG. 2 during the climb of the aircraft.

FIG. 5 is a diagram showing the operation of the system of FIG. 2 when the aircraft is in cruise or when it is in descent phase, or again when it is on the ground and the engine is idling.

FIG. 6 is a plan view of a stage of a plate exchanger used in the above-mentioned system.

FIG. 7 is a plan view of a stage adjacent to the plate exchanger stage of FIG. 6.

In FIGS. 3 to 5, the system is shown in simplified manner.

DETAILED DESCRIPTION OF THE INVENTION

As a reminder, the structure of a twin-spool bypass turbine engine will be recalled below, with reference to FIG. 1.

This figure shows a bypass turbomachine 1 with successively, in the direction of the air circulation, in other words from upstream (to the left in figure) to downstream (to the right in figure), an air inlet 10 and a fan 11, which delivers the air both into a primary duct 12 as well as into a secondary duct 13. The term "duct" shall mean the volume through which an air flow circulates.

The air flow circulating in the primary duct 12 passes successively through a low-pressure compressor 14*a*, a high-pressure compressor 14*b*, a combustion chamber 15, a high-pressure turbine 16*a* and a low-pressure turbine 16*b*, before being discharged through a primary flow nozzle 120.

Furthermore, the secondary airflow which circulates in the secondary duct 13 is ejected separately through a secondary flow nozzle 130, after having passed through a series of guide vanes 131.

The system 2 for heating a cryogenic fuel in accordance with the invention, will now be described in conjunction with FIG. 2.

This system 2 can be used with the turbine engine 1, as described above in conjunction with FIG. 1. However, this system 2 can also be used with another type of turbine engine, for example a single-spool turbine engine or a turbine engine comprising only one compressor and a single turbine.

Thus, in FIG. 2, the turbine engine 1 is shown schematically, with a compressor given the general reference sign 14 and a turbine given the general reference sign 16, respectively disposed upstream and downstream of the combustion chamber 15.

The system 2 comprises a tank 20 for storing said cryogenic fuel in the liquid state. This fuel is, for example, liquefied natural gas or liquid hydrogen. This tank 20 is connected to the combustion chamber 15 by a line 21. A cryogenic fuel/heat-transfer fluid heat exchanger 22 is mounted in the line 21 between the tank 20 and the combustion chamber 15. This heat exchanger 22 can heat the cryogenic fuel before the latter is injected into the combustion chamber 15. For this purpose, an injector is provided in the line 21, downstream of exchanger 22, although this is not shown in the figures.

Finally, a pump 23 is mounted in the line 21, preferably between the storage tank 20 and heat exchanger 22. Its operation is controlled by a central unit 8, such as a computer.

According to a first alternative embodiment, the pump is a high-pressure pump, which can take the cryogenic fuel to above its critical pressure and heat exchanger 22 is a so-called "supercritical" exchanger, because it can take the cryogenic fuel to above its critical temperature. At the outlet of exchanger 22, the fuel is therefore in the supercritical fluid state and is injected, in this state, into the combustion chamber 15.

As a reminder, it will be recalled that the critical point of hydrogen is at 32 K (minus 241.15° C.) and 12.8 bars ($12.8 \cdot 10^5$ Pa), and that the critical point of natural gas is at 190 K (minus 83.15° C.) and 46.8 bars ($46.8 \cdot 10^5$ Pa).

According to a second alternative embodiment, the pump 23 is a pump which can pressurise the cryogenic fuel in the liquid state, but to a pressure less than its critical pressure, in order to deliver the cryogenic fuel flow rate necessary for the aircraft according to these flight phases, (take-off, cruise flight, landing, taxiing) and heat exchanger 22 is a so-called "two-phase" exchanger, because it can take the cryogenic fuel from the liquid state to the gaseous state (phase change), before its injection into the combustion chamber 15.

The system 2 also comprises a closed circuit 3 for circulation of a liquid heat-transfer fluid. The heat-transfer fluid which circulates therein is for example a halogenoalkane, known under the trade name "NOVEC 7500" and marketed by 3M. However, any other heat-transfer fluid that remains in the liquid phase and which has sufficient thermal properties to ensure the heat exchanges which will be described below, can be used.

The circulating of the heat-transfer fluid inside the closed circuit 3 is ensured by a pump 30, also controlled by the central unit 8.

A closed expansion vessel 31 is connected to the circuit 3, at a point located upstream of the circulating pump 30 with respect to the direction of circulation of the heat-transfer fluid in the closed circuit 3. This closed expansion vessel 31 can keep the heat-transfer fluid which is in the circuit 3 under a pressure such that it remains in the liquid state and does not change phase.

The heat exchanger 22 is likewise mounted in the closed circuit 3 in order to perform the heat exchange with the heat-transfer fluid.

Moreover, at least one heat-transfer fluid/working fluid heat exchanger is mounted in the circuit 3, in series with exchanger 22. Various working fluids can be used and are described below.

Advantageously, the circuit 3 is provided with at least one heat exchanger 4 "between the heat-transfer fluid and the bleed air taken at the outlet of the turbine engine compressor 14". This air taken at the outlet of the compressor 14 is referred to as "bleed air".

The exchanger 4 is connected at its inlet 41 to the hot-air outlet of the compressor 14. The hot air circulates inside heat exchanger 4 in counter-current to the heat-transfer fluid which circulates in the closed circuit 3. It emerges from exchanger 4 via the outlet 42, after having delivered heat to the heat-transfer fluid. The thus-cooled air can then be sent into the cabin 43 of the aircraft.

Advantageously, the system 2 can also comprise a "heat-transfer fluid/lubricating oil" heat exchanger 5. This exchanger 5 is connected at its inlet 51 to the lubricating oil network 50 for various mechanical elements of the turbine engine.

Inside the turbine engine, a certain number of mechanical elements must indeed be cooled by the lubricating oil in order to maintain their mechanical integrity. These mechanical elements are, for example, a reduction gear of an accessories gearbox or bearings supporting a rotating shaft. The oil, which is heated in contact with these mechanical elements, enters heat exchanger 5, delivers heat to the heat-transfer fluid circulating in the circuit 3 and emerges via the outlet 52 of exchanger 5, in order to be sent back into the lubricating oil network 50 so that it can be used again in contact with these mechanical elements.

Advantageously, the system 2 can also comprise a heat exchanger 6 "between the heat-transfer fluid and the air cooling the turbine blades". This exchanger 6 is connected at its inlet 61 to the cooling air circuit of the blades of the turbine 16 so as to recover this air once it is heated in contact with said blades. This heated air delivers the heat to the heat-transfer fluid circulant in the circuit 3 and emerges, cooled, via the outlet 62 of exchanger 6. It can then be sent back to the blades of the turbine 16, in order to cool them.

Finally, advantageously, the system 2 also comprises a heat exchanger 7 "between the heat-transfer fluid and the exhaust gas at the outlet of the turbine engine nozzle". This exhaust gas is taken at the outlet of the nozzle 120, in other words the nozzle of the primary duct.

The exchanger 7 is connected at its inlet 71 to the nozzle 120. The hot air circulates inside heat exchanger 7, in counter-current to the heat-transfer fluid which circulates in the closed circuit 3. It emerges via the outlet 72, after having delivered heat to the heat-transfer fluid and is then discharged into the atmosphere via the downstream part of the nozzle.

It can thus be seen that the cooled heat-transfer fluid which leaves the two-phase heat exchanger 22 is heated progressively after each passage through one of the exchangers 4, 5, 6, 7 until reaching a maximum temperature at the inlet 223 of exchanger 22.

The intensity of the heat transfer from the hot sources (in other words the various working fluids circulating in the various exchangers 4, 5, 6 and 7) to the cold source (in other words the liquid heat-transfer fluid) is controlled by the flow rate of the heat-transfer fluid circulating in the closed circuit 3. This flow rate is itself controlled by the speed of rotation of the pump 30. The higher the heat-transfer fluid flow rate, the more heat it captures from the hot sources and the more its temperature increases.

The closed expansion vessel 31 comprises two parts separated by a resilient membrane, the first part is connected to the circuit 3 and receives the heat-transfer fluid and the second part is filled with compressed air (or gas). When the temperature of the heat-transfer fluid increases following heat exchanges with at least one of the exchangers 4, 5, 6 or 7, this fluid expands and the first part of the expansion vessel 31 receives the excess heat-transfer fluid, thus avoiding an increase in pressure in the circuit 3. Conversely, if the temperature of the heat-transfer fluid reduces, the fluid is compressed and the excess heat-transfer fluid present in the expansion vessel 31 returns into the circuit 3.

This expansion vessel 31 can keep the heat-transfer fluid at a pressure sufficient to increase the boiling point thereof and prevent it from passing into the gaseous state. Consequently, the heat-transfer fluid circulating in the circuit 3 only varies in temperature, but its pressure remains constant and it remains permanently in the liquid phase.

Advantageously, the two-phase heat exchanger 22 is a plate exchanger. An exemplary embodiment of such a plate exchanger is shown in FIGS. 6 and 7. Such an exchanger consists of a plurality of superposed plates made of a good thermal conducting material, generally metal, for example aluminium or stainless steel, these various plates being assembled together by welding, by brazing or with the use of seals.

One of the main advantages of this type of exchanger is the maximisation of convective exchanges, in comparison with other types of exchanger. Finally, advantageously, in the embodiment shown in the figures, and in order to maximise the heat transfer, the plates of each stage comprise a multitude of channels disposed to form V-shaped chevrons.

In a given stage of the two-phase heat exchanger 22, the stage with reference sign 22a in FIG. 6 (and arranged between two neighbouring plates), the cryogenic fuel in the liquid state enters via the inlet 221 of exchanger 22, passes through this stage and emerges in the gaseous state via the outlet 222. In an immediately neighbouring stage, the stage with reference sign 22b in FIG. 7, the heat-transfer fluid enters via the inlet 223 of exchanger 22, passes through this stage and emerges via the outlet 224 (see also the diagram of FIG. 2).

Preferably, and as shown in FIG. 2, the circuit 3 is equipped with the four types of exchangers 4, 5, 6 and 7 described above, and the various heat exchangers 4, 5, 6 and 7 are mounted in series in the closed circuit 3. More preferably, they are mounted in this order, with respect to the direction of circulation of the heat-transfer fluid inside the closed circuit 3, from the outlet 224 of heat exchanger 22 to the inlet 223.

Preferably, when there are at least two heat exchangers from the above-mentioned exchangers 4, 5, 6 and 7 and in order to be able to optionally select only some of these, it is possible to provide at least one of these exchangers with an on-off valve, mounted upstream of this exchanger, and a bypass circuit that connects a point of the closed circuit 3 located upstream of this on-off valve and a point of the closed circuit 3 located downstream of said heat exchanger.

Hence, for example, the exchangers 4, 5, 6 and 7 are provided with on-off valves, respectively having reference signs 44, 54, 64 and 74, and bypass circuits, respectively having reference signs 45, 55, 65 and 75. In addition, each above-mentioned bypass circuit 45, 55, 65 and 75 is provided with an on-off valve 450, 550, 650 and 750.

The set of on-off valves 44, 54, 64, 74, 450, 550, 650 and 750 is controlled by the central unit 8.

FIGS. 3, 4 and 5 show various operating situations of the system 2, according to the flight phases of the aircraft. In each of these figures, the circulation of the heat-transfer fluid is represented by a thick line.

FIG. 3 illustrates the situation during take-off of the aircraft. In this case, valves 450, 54, 64 and 74 are open, while valves 44, 550, 650 and 750 are closed.

This makes it possible to not use heat exchanger 4 between the heat-transfer fluid and the bleed air taken at the outlet of the turbine engine compressor. Indeed, during take-off, the air bleed is cut-off in order to obtain maximum propulsion power. There is therefore no air flow to be cooled.

FIG. 4 shows the situation during climb of the aircraft after take-off. In this case, valves 450, 54, 650 and 74 are open, while valves 44, 550, 64 and 750 are closed. This makes it possible to not use heat exchanger 4 between the heat-transfer fluid and the bleed air taken at the outlet of the turbine engine compressor, and not use heat exchanger 6 between the heat-transfer fluid and the cooling air of the turbine blades. Hence, after take-off when the engine reaches its maximum temperature, exchanger 6 can be closed in order to limit losses since the cooling function of the air cooling the blades is no longer necessary.

Finally, FIG. 5 illustrates the situation in flight or in the descent phase or again in the phase with the aircraft taxiing on the ground when the turbine engine of the aeroplane operates in idle. In this case, valves 44, 54, 650 and 750 are open, while valves 450, 550, 64 and 74 are closed. This makes it possible to not use heat exchanger 6 between the heat-transfer fluid and the cooling air of the turbine blades, and not use heat exchanger 7 between the heat-transfer fluid and the exhaust gas at the outlet of the turbine engine nozzle. Indeed, in the above-mentioned situations, the flow rate of cryogenic fuel is lower and it suffices to heat it using only exchangers 4 and 5. Exchanger 7 can thus be closed and the air from the nozzle bypasses this exchanger in order to limit the losses caused by its presence in the air flow.

According to an alternative embodiment shown only in FIGS. 3 to 5, it is possible to provide a bypass line 32 in the closed circuit 3, this bypass line 32 joining a point located in the circuit 3 downstream of the circulating pump 30 and upstream of exchanger 22 to a point located downstream of exchanger 22 and upstream of heat exchanger 4 between the heat-transfer fluid and the bleed air taken at the outlet of the turbine engine compressor. A thermostatic valve 33 equipped with a temperature sensor 34 is provided on this bypass line. The thermostatic valve 33 is controlled as a function of the temperature and optionally other factors such as the flight phase, or starting/restarting. This bypass line 32 can divert part of the flow which passes into heat exchanger 22 during starting or restarting and in certain flight phases.

Below a certain temperature, the valve 33 is controlled to allow the passage of a part of the heat-transfer fluid flow in the bypass line 32 and no longer only in exchanger 22, and this in order to control the phase change of the fuel or its supercritical state. It is also possible to provide that, in a given temperature range and as the temperature detected by the sensor 34 increases, an increasing portion of the heat-transfer fluid is directed into the bypass line 32.

The heating system 2 according to the invention has the following advantages:

it comprises only a single cryogenic fuel/heat-transfer fluid heat exchanger 22 and it is possible to provide the heat necessary for heating the cryogenic fuel via a single closed circuit 3 inside which circulates a heat-transfer fluid kept in the liquid state and for which only the temperature varies.

In contrast to the prior art, where the cryogenic fuel was heated by passage through a heat exchanger, inside which circulated air coming from the secondary duct, the risk of ice on exchanger 22 is reduced here because the temperature of the heat-transfer fluid which circulates inside the closed circuit 3 is easier to control.

The line 21 is short, since it is necessary to have only a single exchanger 22 between the tank 20 and the combustion chamber 15 and not several exchangers, as would be the case when it is desired to recover heat from various working fluids. This makes it possible to limit the circulation of the cryogenic fuel, in particular liquefied natural gas, in hot and therefore inflammable regions of the aircraft.

In addition, a two-phase heat exchanger, inside which a phase change is produced, is more difficult to control. Consequently, it is preferable to reduce their number.

In addition, inside the line 21, it is only necessary to manage the pressure of the cryogenic fuel, via the pump 23, the temperature being managed by the heat supplied by the heat-transfer fluid circulating in the closed circuit 3.

In the preferred alternative embodiment of the system 2 shown in FIG. 2, the heat-transfer fluid has already been heated by passing through exchanger 4, before reaching exchanger 5. Consequently, the oil brought through exchanger 5 is cooled, but only to a temperature that is sufficiently high to prevent it from freezing or solidifying.

The heat exchangers 4, 5 and 6 can cool the various working fluids which are brought to them, according to their cooling needs.

The heat exchanger 7 can adjust the temperature of the heat-transfer fluid circulant in the circuit 3, using a heat source (in this case the exhaust gas at the outlet of the turbine engine nozzle 120), which is continuous, as soon as the aircraft is operating, and which also does not need to be cooled for the operating needs of the aircraft. Heat exchanger 7 therefore constitutes an adjustment variable for the operation of the heating system 2.

The invention claimed is:

1. A system for heating cryogenic fuel supplying a combustion chamber of an aircraft turbine engine, the system comprising:
    a storage tank for the cryogenic fuel in a liquid state,
    a supply line configured to connect the storage tank to the combustion chamber of the aircraft turbine engine,
    a closed circuit for circulation of a heat-transfer fluid,
    a cryogenic fuel/heat-transfer fluid heat exchanger and a heat exchanger between the heat-transfer fluid and a bleed air taken at an outlet of the turbine engine compressor, a heat-transfer fluid/oil heat exchanger, a heat exchanger between the heat-transfer fluid and an air cooling the turbine blades and a heat exchanger between the heat-transfer fluid and an exhaust gas at the outlet of the turbine engine nozzle, mounted in series and in this order in the closed circuit for circulation of the heat-transfer fluid, the cryogenic fuel/heat-transfer fluid heat exchanger enabling heating of the cryogenic fuel by an input of heat delivered by the heat-transfer fluid, and
    a control unit,
    wherein the closed circuit for circulation of the heat-transfer fluid comprises a pump for circulating the heat-transfer fluid and a closed expansion vessel,
    wherein the closed expansion vessel is connected to said closed circuit between the pump and the heat exchanger between the heat-transfer fluid and the exhaust gas at the outlet of the turbine engine nozzle, and
    wherein the control unit controls the pump to ensure a heat-transfer fluid flow rate inside the closed circuit which enables cooling of the bleed air taken at the outlet of the turbine engine compressor, cooling of an oil, cooling of the air cooling the turbine blades, cooling of the exhaust gas at the outlet of the turbine engine nozzle and heating of the cryogenic fuel according to operating phases of the aircraft, and so that the closed expansion vessel keeps the heat-transfer fluid circulating in the closed circuit at a pressure such that the heat-transfer fluid remains in the liquid state and does not change phase.

2. The system according to claim 1, further comprising a pump disposed in the supply line between the tank and the heat exchanger,
    wherein the pump is a high-pressure pump which can compress the cryogenic fuel in the liquid state in order to bring the cryogenic fuel to a pressure greater than the critical pressure of the cryogenic fuel, and
    wherein the cryogenic fuel/heat-transfer fluid heat exchanger is a supercritical heat exchanger which can heat the cryogenic fuel to a temperature greater than the critical temperature of the cryogenic fuel in order to bring the cryogenic fuel into a supercritical fluid state before the introduction of the cryogenic fuel into the combustion chamber.

3. The system according to claim 1, comprising a pump disposed in the supply line between the tank and the heat exchanger,
    wherein the pump is a pump which can compress the cryogenic fuel in the liquid state in order to bring the cryogenic fuel to a pressure less than the critical pressure of the cryogenic fuel, and
    wherein the cryogenic fuel/heat-transfer fluid heat exchanger is a two-phase heat exchanger, which can heat the cryogenic fuel by an input of heat delivered by the heat-transfer fluid, in order to take the cryogenic fuel from the liquid state to the gaseous state, before the introduction of the cryogenic fuel into the combustion chamber.

4. The system according to claim 1,
    wherein for at least one specific heat-exchanger among the heat exchanger between the heat-transfer fluid and the bleed air taken at the outlet of the turbine engine compressor, the heat-transfer fluid/oil heat exchanger, the heat exchanger between the heat-transfer fluid and the air cooling the turbine blades and the heat exchanger between the heat-transfer fluid and the exhaust gas at the outlet of the turbine engine nozzle, an on-off valve is mounted in the closed circuit, upstream of the specific heat exchanger,
    wherein a bypass circuit connects a point of the closed circuit located upstream of the on-off valve mounted upstream of the specific heat-exchanger to a point of the closed circuit located downstream of this same specific heat-exchanger, and wherein the bypass circuit is provided with another on-off valve.

5. The system according to claim 1, wherein the cryogenic fuel is liquefied natural gas or liquid hydrogen.

6. The system according to claim 3, wherein the two-phase cryogenic fuel/heat-transfer fluid heat exchanger is a plate exchanger.

7. An aircraft turbine engine comprising a combustion chamber supplied with cryogenic fuel and the system for heating the cryogenic fuel according to claim 1.

* * * * *